Jan. 26, 1937.    H. FLATHER    2,069,139
GRAIN CLEANER, SEPARATOR, AND THE LIKE
Filed June 15, 1934

INVENTOR
HARRY FLATHER
BY Featherstonhaugh & Co
ATTORNEYS

Patented Jan. 26, 1937

2,069,139

UNITED STATES PATENT OFFICE 2,069,139

GRAIN CLEANER, SEPARATOR, AND THE LIKE

Harry Flather, Brisbane, Australia, assignor to Brisbane Machinery Co. (Pty.) Ltd., South Brisbane, Queensland, Australia Application June 15, 1934, Serial No. 730,701

1 Claim. (Cl. 209—234)

This invention relates to improvements in grain cleaners, separators, and the like.

It is recognized that grain on leaving the farms contains straws, string, stalks, dust, small seeds, broken grains, oats, barley, nail, wood and the like, which must be separate from the grain before being considered to be in a suitable state for the process of manufacture into flour and other products.

Numerous types of machine are in use to effect this separation, but the actions employed such as, vibratory, reciprocating, gyrating and drum like, allow so large a percentage of the foreign materials to pass through the meshes or holes along with the grain that there is room for a machine combining novel devices and combination not hitherto employed.

The object of this invention is to attain greater efficiency; the novel devices and combinations allowing for each machine having a wide range of capacities. A machine built to treat say 100 tons of grain per hour efficiently is capable of treating 20 tons with equal efficiency.

The action of the machine is such that no banking up of the grain takes place as is essential in some other types of machines. Whereas these other types of machines have actions which cause a disturbing influence on the whole conglomeration of stocks which are being treated; with the machine herein described there are no such disturbing actions in the primary mechanical separation of the straws, string, stalks and the like, as these large materials once they come in contact with the conveyor lie practically dormant whilst being carried on and over the end of the conveyor, whilst advantage is taken of the grain being oval and having a tendency to roll through the mesh at the least provocation, and for these reasons relatively fine meshes can be employed, thus giving a highly efficient result.

In connection with the machine I employ an exhausting system common to this type of machine. This includes a fan and an air current which passes through the grain and foreign materials as they fall from the feed gate to the conveyor so that foreign materials including straws, string, dust, light chaff, seeds and the like are drawn from the commingled stock before reaching the conveyor; thus increasing the efficiency of the conveyor.

Generally, this machine comprises a feed gate to spread the grain evenly across the width of the lower end of a continuous wire mesh conveyor rotating round two or more sets of discs fitted to two or more transverse shafts revolving at a slow speed, a wire mesh cylinder which treats any good material which may be carried over the rotating conveyor, a rectangular sieve of fine wire mesh obtaining its action by means of cams and rods at one end and pivoted at the opposite end; the whole of this combination being set up in a wood or iron frame and the shafts so connected that the machine can be driven from a single power actuated belt, chain or by other suitable means.

The accompanying drawing illustrate a machine designed to operate as a scalper and cleaner or aspirator. In the said drawing like characters indicate like parts throughout the several views.

Figure 1:
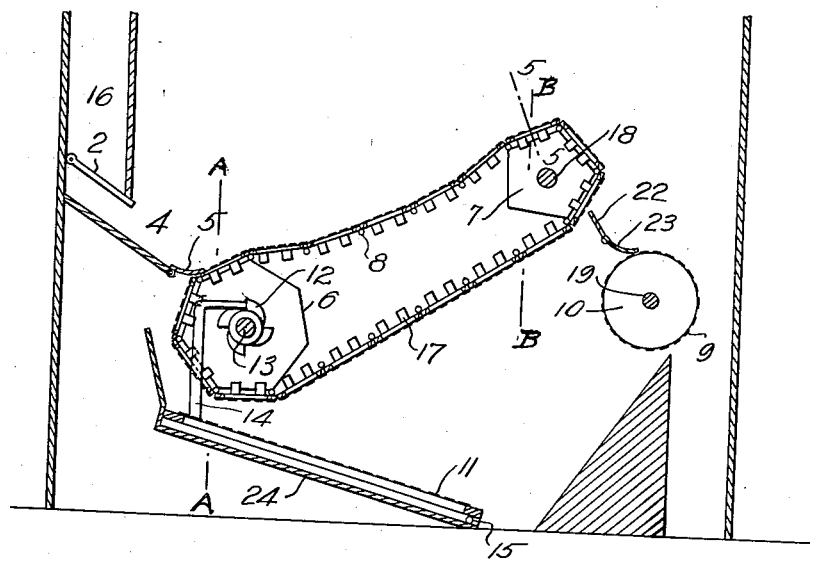
Fig. 1 is an end view.
Figures 2, 3:
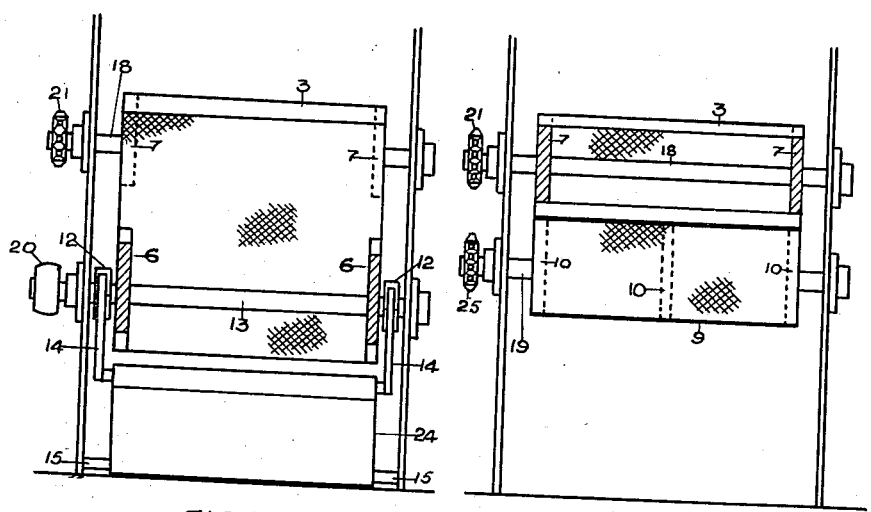
Fig. 2 is a longitudinal view through the line AA.
Fig. 3 is a longitudinal view through the line BB.
Figure 4:
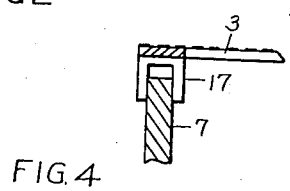
Fig. 4 is a detail sectional view taken on line 5—5, Fig. 1.

As illustrated in the drawing the machine comprises a hopper or supply spout 16 and by means of an automatic gate 2 the grain is spread evenly on to an inclined feed plate 4 fitted with hinged flap 5 which feeds the grain across the width of the conveyor 3 comprising a number of hinged connected sections of about equal width and length and preferably made of woven wire mesh of suitable size according to the material to be treated but which may be made of perforated steel or metal rods. On the underside of each section is fixed two or more metal guides 17 preferably made of channel iron, but which may be made of angle iron or T iron.

These sections are joined to each other to form a continuous conveyor 3 and in such manner that the joints 8 will form hinges.

The conveyor 3 travels round two or more wood or metal discs 6 of regular polygon shape at the feed or lower end and two or more similar wood or metal discs 7 at the tail or higher end; the polygonal discs at the top end are preferably of different size to the polygonal discs at the bottom end, these discs 6 and 7 respectively are preferably heptagonal at the feed or lower end and preferably pentagonal or quadragonal at the tail or upper end, but may be made with a larger or smaller number of sides causing the conveyor for its whole length between the upper and lower discs to gently flap up and down, with an unsynchronized and irregular action.

The discs 6 are rigidly secured to a transverse shaft 13 with suitable bearings at each end, and provided at one end with a pulley 20 by which the conveyor 3 can be driven from a power actuated belt or chain or by other suitable means.

The discs 7 are rigidly secured to shaft 18 with suitable bearings at each end and provided at one end with a sprocket 21. A feed plate 22 fitted with hinged flap 23 and securely fastened at each end to the sides of the machine and fixed at such an angle so as to cause all the straws, string, stalks, and the like which fall over the end of the conveyor 3 to come in contact with the meshes of the cylinder 9.

A cylinder 9 comprises a woven wire mesh fastened to two or more discs 10; the said parts 9 and 10 being securely fastened to a transverse shaft 19 with suitable bearings at each end, and provided at one end with a sprocket 25.

The sprockets 21 and 25 may be linked together by means of a chain although other means of linking may be used.

The conveyor 3 and the cylinder 9 are thus connected to each other and so arranged to rotate on an approximately horizontal axis.

A rectangular screen 11 comprises a wood or iron frame on which a wire screen is securely fastened, and in such position that the grain will fall through the conveyor 3 on to it. Beneath the wood or iron frame is fastened a plain metal sheet 24 to form a hopper or catch trough to receive the material which passes through the wire screen.

On shaft 13 are securely fastened two cams 12 having preferably four points but they may have any practicable number of points.

Securely fastened to screen 11 are two rods 14 and so shaped and in such position that when the shaft 13 is revolving an up and down motion is transmitted to the screen 11 at the higher end. The lower end of the screen 11 is pivoted at 15.

The conveyor 3 and the screen 11 are thus connected to each other and are so arranged that the moving of the conveyor 3 actuates the movement of the screen 11. The angle of inclination of the conveyor is preferably twenty-five degrees for treating wheat but may be varied according to the nature of the material being treated. It will be obvious that the length of each side of both the upper and the lower discs must be the same as, or a multiple of the distance between the joints 8 so that the angular points of the discs will contact with the screen 3 exactly at the joints 8.

*Operation.*—The grain which contains straws, string, stalks, dust, small seeds, broken grain, oats, barley, nails, wood and the like will be spread evenly by means of the gate 2 on to the feed plate 4 and thence fed to the lower end of the conveyor 3 which will rotate. The specially constructed flap 5 ensures the straws and the like coming in contact with the screen laterally and not end on. The grain, small seeds, dust, broken grain and the like on coming in contact with the moving conveyor will pass through and fall on to the screen 11 whilst the straws, stalks, nails and the like will be carried over the opposite end and by means of a feed plate similar in construction to feed plate 5, will come in contact with the rotating cylinder 9 through the screen of which will pass any grain, small seeds, broken grain and the like not already separated from the straws, string, stalks, nails and the like whilst the straws, string, stalks, nails and the like will be carried over a cylinder and discharged at the other end.

The grain, small seeds, dust, broken grain and the like will fall on to the screen 11 which will by its action allow the small seeds, dust, broken grain and the like to pass through a screen and into a hopper, whilst the cleaned grain, freed from straws, string, stalks, dust, small seeds, broken grain, oats, barley, nails, wood and the like will then be sent to a desired place.

I would have it understood that I do not confine myself to the precise details of construction as herein described, but modifications and alterations may be resorted to that fairly come within the scope and spirit of the invention.

What I claim as my invention, and desire to secure by Letters Patent is:—

In a grain cleaner and separator, an inclined conveyor belt on to the lower end of which uncleaned grain is fed, two parallel rotatable shafts, pairs of polygonal discs fixed on said shafts and on which the conveyor belt is mounted, the discs of one shaft having a greater number of sides than those on the other shaft, means for guiding the belt around such disc to impart an uneven undulating motion to the belt as the discs rotate, driving means associated with one of said shafts to move the belt with its upper flight in ascending direction, cams on said shaft, an inclined screen pivoted at its lower end and adapted to receive any grain passing through the belt conveyor and disposed below the lower flight of said conveyor, an arm coacting with said cams arranged for applying vibratory jarring movement to said screen to shake the grain therethrough, and a suitably driven perforate cylindrical screen adapted to receive the waste discharge from the upper end of the conveyor and adapted to permit grain contained in the waste material to pass through such cylindrical screen and to discharge the waste material from its periphery.

HARRY FLATHER.